(12) United States Patent
Atasu et al.

(10) Patent No.: US 11,176,186 B2
(45) Date of Patent: Nov. 16, 2021

(54) CONSTRUING SIMILARITIES BETWEEN DATASETS WITH EXPLAINABLE COGNITIVE METHODS

(71) Applicant: International Business Machines Corporation, Armonk, NY (US)

(72) Inventors: Kubilay Atasu, Rueschlikon (CH); Cesar Berrospi Ramis, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 83 days.

(21) Appl. No.: 16/831,901

(22) Filed: Mar. 27, 2020

(65) Prior Publication Data
US 2021/0303609 A1  Sep. 30, 2021

(51) Int. Cl.
*G06F 16/30* (2019.01)
*G06F 16/33* (2019.01)
(Continued)

(52) U.S. Cl.
CPC ........ *G06F 16/3347* (2019.01); *G06F 16/338* (2019.01); *G06F 16/35* (2019.01); *G06K 9/00483* (2013.01); *G06K 9/6212* (2013.01)

(58) Field of Classification Search
CPC .... G06F 16/3347; G06F 16/35; G06F 16/338; G06K 9/00483; G06K 9/6212
See application file for complete search history.

(56) References Cited

U.S. PATENT DOCUMENTS 8,560,539 B1 * 10/2013 Engebretsen ......... G06F 16/355
707/736
2009/0313239 A1 * 12/2009 Wen .................... G06F 16/5838
(Continued)

FOREIGN PATENT DOCUMENTS

CN       100412869 C     9/2006
CN       101286159 A    10/2008
(Continued)

OTHER PUBLICATIONS

Article entitled "Speeding up Word Mover's Distance and its variants via properties of distances between embeddings", by Werner et al., dated Dec. 2019 (Year: 2019).*
(Continued)

*Primary Examiner* — Mahesh H Dwivedi
(74) *Attorney, Agent, or Firm* — Stephanie L. Carusillo

(57) ABSTRACT

In an approach for construing similarities between datasets, a processor accesses a pair of sets of feature weights, wherein the sets of feature weights include a query dataset and comprises first weights associated to first features and a reference dataset and comprises second weights associated to second features. Based on similarities between the first features and the second features, a processor discovers flows from the first features to the second features, wherein the flows maximize an overall similarity between the pair of sets of feature weights. Based on the similarities and the flows, a processor computes pair contributions to the overall similarity in order to obtain contributive elements, wherein the pair contributions are contributions of pairs joining the first features to the second features. A processor ranks the contributive elements to obtain respective ranks. A processor returns a result comprising the contributive elements and indications to the respective ranks.

20 Claims, 8 Drawing Sheets

(51) Int. Cl.
*G06F 16/35* (2019.01)
*G06F 16/338* (2019.01)
*G06K 9/62* (2006.01)
*G06K 9/00* (2006.01)

(56) References Cited

U.S. PATENT DOCUMENTS

| | | | |
|---|---|---|---|
| 2013/0179456 A1* | 7/2013 | Yamamoto | H04N 21/235 707/749 |
| 2020/0175092 A1* | 6/2020 | Atasu | G06F 17/16 |
| 2021/0209311 A1* | 7/2021 | Liu | G06F 40/35 |

FOREIGN PATENT DOCUMENTS

| | | | |
|---|---|---|---|
| CN | 107623639 A | * | 1/2018 |
| CN | 109740143 A | | 5/2019 |

OTHER PUBLICATIONS

"Watson Machine Learning Community Edition", WMLCE, printed on Mar. 11, 2020, 9 pages, <https://public.dhe.ibm.com/ibmdl/export/pub/software/server/ibm-ai/conda/#/>.

Atasu et al., "Linear-complexity relaxed word mover's distance with GPU acceleration", © 2017 IEEE, arXiv:1711.07227v1 [cs.IR] Nov. 20, 2017, 8 pages.

Atasu et al., "Linear-Complexity Data-Parallel Earth Mover's Distance Approximations", Proceedings of the 36th International Conference on Machine Learning, Long Beach, California, PMLR 97, 2019. Copyright 2019 by the author(s), 10 pages.

Furmanek, Jay, "Watson Machine Learning Community Edition 1.7.0 is your engine for building AI", Grace Period Disclosure, Published on Feb. 21, 2020, Updated on Feb. 25, 2020, 5 pages, <https://developer.ibm.com/linuxonpower/2020/02/21/watson-machine-learning-community-edition-1-7-0-is-your-engine-for-building-ai/>.

Kusner et al., "From Word Embeddings to Document Distances", Proceedings of the 32nd International Conference on Machine Learning, Lille, France, 2015, JMLR: W&CP vol. 37, Copyright 2015 by the author(s), 10 pages.

Mikolov et al., "Efficient Estimation of Word Representations in Vector Space", arXiv: 1301.3781v3 [cs.CL] Sep. 7, 2013, 12 pages.

Ren et al., "Emotion computing using Word Mover's Distance features based on Ren_CECps", PLOS ONE, Apr. 6, 2018, 17 pages, <https://doi.org/10.1371/journal.pone.0194136>.

Rubner et al., "A Metric for Distributions with Applications to Image Databases", Proceedings of the 1998 IEEE International Conference on Computer Vision, Bombay, India, 8 pages.

\* cited by examiner

CONSTRUING SIMILARITIES BETWEEN DATASETS WITH EXPLAINABLE COGNITIVE METHODS

STATEMENT ON PRIOR DISCLOSURES BY AN INVENTOR

The following disclosure(s) are submitted under 35 U.S.C. 102(b)(1)(A) as prior disclosures by, or on behalf of, a sole inventor of the present application or a joint inventor of the present application:

(i) Watson Machine Learning Community Edition 1.7.0, Jay Furmanek, 2/21/20, https://developer.ibm.com/linuxonpower/2020/02/21/watson-machine-learning-communityedition-1-7-0-is-your-engine-for-building-ai/, https://public.dhe.ibm.com/ibmdl/export/pub/software/server/ibm-ai/conda/#/

BACKGROUND

The present invention relates in general to the field of data analysis, and more particularly to construing similarities between datasets.

Modern computational systems are capable of ingesting, storing, and searching across a prodigious amount of textual or image data. Efficient search through textual information should ideally allow both high-quality results and speed of execution.

The so-called Earth Mover's Distance (EMD) method was initially proposed in the field of image retrieval to quantify similarities between images. In optimization theory, a more general formulation of EMD, called Wasserstein distance, has been used extensively to measure the distance between probability distributions. The EMD methods, adaptations, and simplifications thereof can be used for similarity search in image and text databases.

For example, in the field of text retrieval, an adaptation of EMD, called Word Mover's Distance (WMD), has emerged as a suitable similarity metric. WMD captures semantic similarity by capitalizing on word embeddings. Word embeddings map words onto a high-dimensional vector space, such that the words that are semantically similar are represented as vectors pointing at points that are close to each other. The embedding vectors can be pre-trained in an unsupervised way, e.g., by running the so-called word2vec algorithm on available datasets. While traditional methods may fail to detect the similarity between sentences that have no words in common (even though they cover the same topic), WMD can detect and quantify the similarity by taking the proximity between the different words into account (see FIG. 1 for an illustration).

In general, though, the underlying cognitive models act as black boxes, i.e., a trained neural network does not provide any intelligible explanation of the classification decisions it makes. Now, commercial deployments of AI solutions may require transparency and explainability of the decisions made by AI-powered systems. Therefore, explainability and interpretability emerge as important requirements for modern machine learning and artificial intelligence systems. In particular, there is a need for new solutions for computing explainable, EMD-like similarity results.

SUMMARY

According to several aspects, the present invention is embodied as a computer-implemented method, computer program product, and computer system for construing similarities between datasets. The present invention first comprises accessing a pair of sets of feature weights. The sets include a first set and second set that pertain to a query dataset and a reference dataset, respectively. The first set comprises first weights, which are associated to first features. The second set comprises second weights, which are associated to second features. The sets of feature weights are typically representable as histograms. Based on similarities between the first features and the second features, flows from the first features to the second features are then discovered; such flows maximize an overall similarity between the pair of sets of feature weights accessed. Next, pair contributions to the overall similarity are computed based on the similarities and the flows discovered, in order to obtain contributive elements, i.e., elements that contributes to the overall similarity between the pair of sets of feature weights accessed. The pair contributions denote contributions of pairs joining the first features to the second features. The contributive elements are subsequently ranked, so as to obtain ranks for the contributive elements, and a result is eventually returned, which result comprises one or more of the computed contributive elements, as well as respective indications as to respective ranks of the contributive elements.

The proposed solution allows the overall similarity results to be explained (i.e., interpreted), e.g., by identifying specific pairs of words, sentences, paragraphs, or chapters that most contributes to the overall similarity between the compared documents. Interestingly, the computation of the contributive elements does not require intractable derivative computations. In fact, the contributive elements are obtained from the contributions of pairs joining the first features to the second features, i.e., the same pairs as used to discover the flows.

For instance, the pair contributions may be computed by multiplying matrix elements of a flow matrix by matrix elements of a similarity matrix, wherein the flow matrix and the similarity matrix capture the discovered flows and the ground similarities, respectively. In that case, the overall similarity just corresponds to the sum of the pair contributions computed over all of the pairs joining the first features to the second features, such that no additional components need be computed, apart from the contributive elements themselves.

However, the latter can be taken as very simple functions of the pair contributions. For instance, the contributive elements may restrict to the sole pair contributions. In that case, no additional computation is required as the same pair contributions are already used to compute the overall similarity. Note, the overall similarity may possibly be computed a posteriori, based on the computed pair contributions. Conversely, the pair contributions may be computed after having computed the overall similarity. In other variants, contributive elements are obtained by summing the pair contributions over the first features and/or the second features, e.g., in addition to the pair contributions.

Preferably, returning said result comprises displaying a subset of one or more of said contributive elements that are highest ranked elements (according to their respective ranks). Respective indications as to the respective ranks may be displayed as well, e.g., as one or more visual cues, respectively.

In embodiments, the flows are discovered according to a linear-complexity optimization method, to reduce the computational complexity with respect to known techniques such as the EMD technique, the WMD, or even the Relaxed WMD.

Preferably, the flows are discovered using linear algebra primitives of general-purpose computing on graphics processing units, an execution of which is distributed across a cluster of graphics processing units.

Two classes of embodiments are now briefly discussed, which involve, each, several computation cycles based on several pairs of sets of feature weights. One of such classes of embodiments concerns methods in which the steps of accessing a pair of sets, discovering flows, computing pair contributions, and ranking the contributive elements are all performed several times in respect of several pairs of sets of feature weights. Here, one set of feature weights of each of the several pairs pertains to the query dataset, whereas the other sets of feature weights (of the several pairs involved) pertain to distinct datasets (the latter including said reference dataset). The method can be performed so as to eventually determine overall similarities between the query dataset and the distinct datasets.

In particular, the distinct reference datasets may advantageously be labelled, i.e., associated to labels, whereby the method further comprises classifying the query dataset according to the labels of the reference datasets, and according to the overall similarities determined. Such embodiments allow explainable classification to be easily obtained.

Various types of datasets can be contemplated, including images and text documents. For instance, the query dataset and the reference datasets may pertain to images. In that case, the first features and the second features may correspond, each, to a pixel property or a semantic feature of a respective image. In variants, each of the query dataset and the reference datasets comprises text. In this case, the first features and the second features correspond, each, to textual units of one or more words. The textual units are subsets of the query dataset and the reference dataset, respectively. For example, each of the first features and the second features may corresponds to a word.

In embodiments, the first features and the second features are mapped onto a vector space and thereby correspond to vectors of this vector space. There, the method may further comprise computing said similarities (i.e., ground similarities) based on vectors corresponding to the first features and vectors corresponding to the second features, prior to discovering the flows.

Another class of embodiments is now discussed, which aims at exploiting the hierarchical structure of the compared documents to ease the user understanding of the similarities found. As per this hierarchical structure, the query dataset may comprise first supersets of the first features, while the reference dataset may similarly comprise second supersets of the second features. In that case too, the steps of accessing a pair of sets, discovering flows, computing pair contributions, and ranking the contributive elements, may all be performed several times in respect of several pairs of sets of feature weights, these including said pair of sets of feature weights, so as to determine overall similarities between the first supersets and the second supersets. In other words, comparing a single pair of sets of feature weights allows an overall similarity between supersets of the features to be obtained, and repeating the process for several pairs of sets of feature weights allows several, overall similarities between supersets of the features to be obtained. The same process can be repeated on the upper level, based on supersets of the supersets, and so on.

Such a process typically requires to access further weights associated to the first supersets and the second supersets. Then, based on the determined, overall similarities between the first supersets and the second supersets and said further weights, further flows (from the first supersets to the second supersets) can be discovered. The further flows discovered maximize a global similarity between the query dataset and the reference dataset, as driven by the supersets compared. Then, based on the overall similarities determined and the further flows discovered, further pair contributions to the global similarity may be computed, in order to obtain further contributive elements. The further pair contributions correspond to further pairs joining the first supersets to the second supersets. The further contributive elements are subsequently ranked to obtain respective ranks. Eventually, a further result can be returned, which comprises one or more of the further contributive elements together with indications as to their respective ranks.

Note, at build-time, lower-level results are normally computed prior to computing higher-level results. However, things will typically go differently when a user navigates the results displayed. In other words, higher-level results are normally displayed first. For example, in embodiments, any result comprising one or more of the contributive elements to a given one of the lower-level similarities (referred to as overall similarities above) is returned upon receiving a user selection of a corresponding one of the further pairs, i.e., after having returned a "further result", i.e., a result corresponding to a higher-level similarity (between supersets of features).

For example, each of the query dataset and the reference dataset may comprise text, whereby each of the first features and the second features corresponds to words, and each of the first superset and the second superset corresponds to a textual unit of two or more words (e.g., sentences or paragraphs).

BRIEF DESCRIPTION OF THE DRAWINGS

The accompanying figures, where like reference numerals refer to identical or functionally similar elements throughout the separate views, and which together with the detailed description below are incorporated in and form part of the present specification, serve to further illustrate various embodiments and to explain various principles and advantages all in accordance with the present disclosure.

FIG. 3 is, per se, not according to embodiments, though similar optimization techniques can be devised to efficiently transform histograms in embodiments. FIG. 3(a) schematically illustrates the conversion of an image into a histogram with the weights being the pixel values and the embedding vectors being the pixel coordinates. FIG. 3(b) illustrates the computation of a cost-flow optimization between two flattened histograms, given a cost matrix.

The accompanying drawings show simplified representations of concept and systems, or parts thereof, as involved in embodiments. Similar or functionally similar elements in the figures have been allocated the same numeral references, unless otherwise indicated.

DETAILED DESCRIPTION

Figure 6:
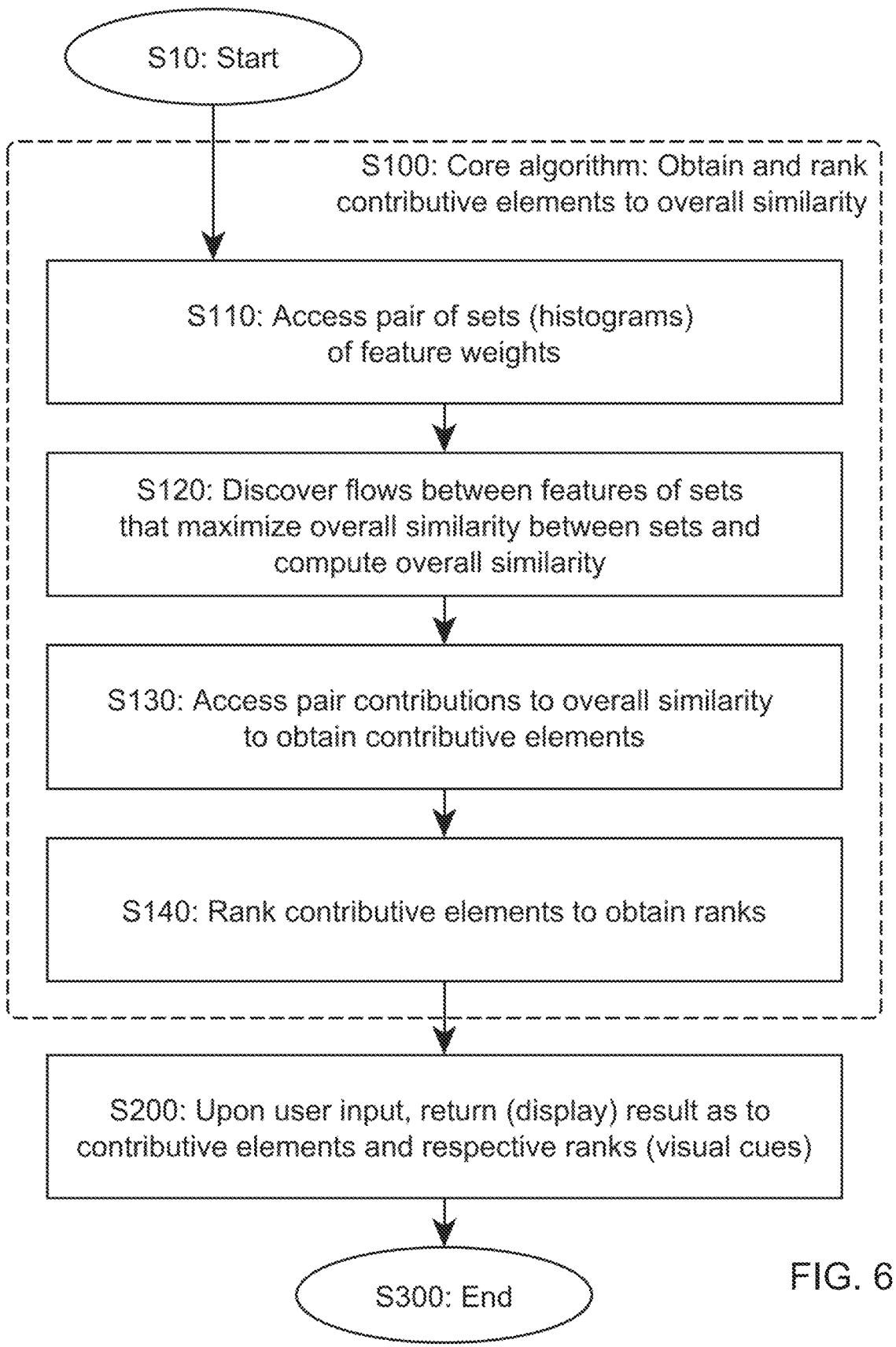
FIG. 6 is a flowchart illustrating high-level steps of a method of construing similarities between datasets, in accordance with an embodiment of the present invention.

In reference to FIG. 6, an aspect of the invention is first described, which concerns a computer-implemented method of construing similarities between datasets. Note, this method and its variants are collectively referred to as the "present methods" in this document. All references Sij refer to methods steps of the flowchart of FIGS. 6-8, while numeral references pertain to components of the computerized unit 101 shown in FIG. 9 or to concepts utilized by the present methods. All the computerized methods described herein can be performed using a computerized unit 101 such as depicted in FIG. 9.

Figure 3:
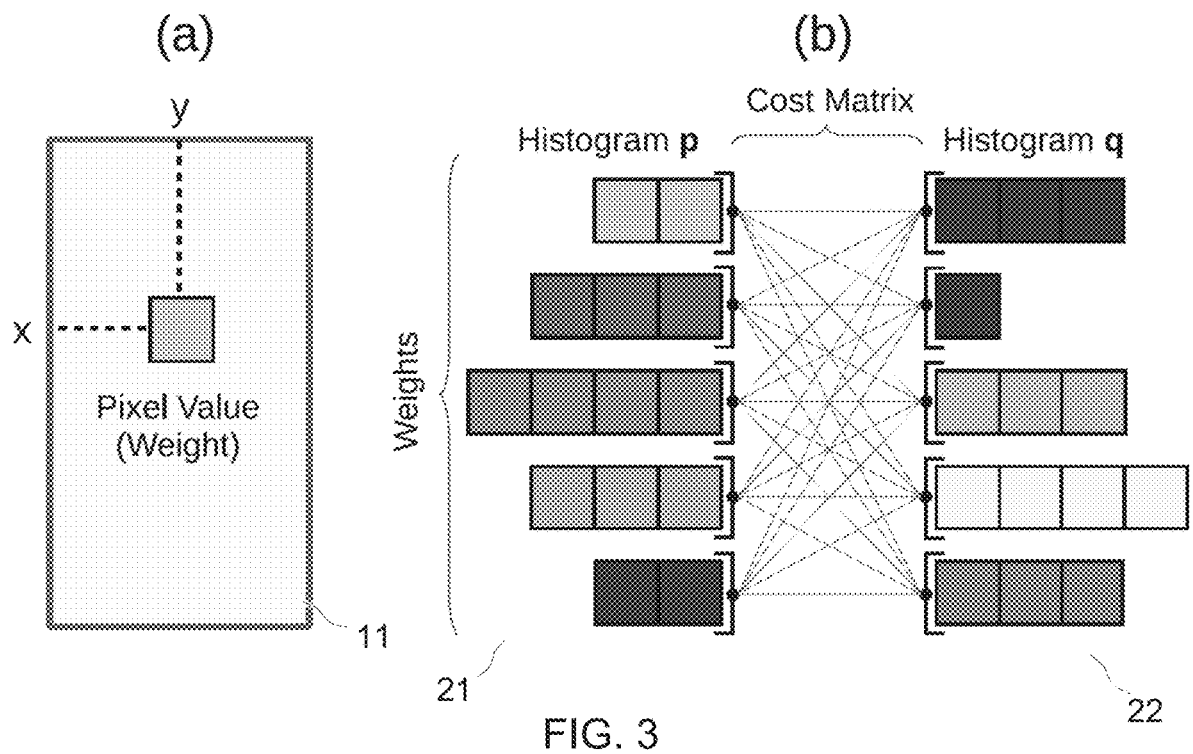
FIG. 3 illustrates a cost-flow optimization method to transform a histogram into another.

The present methods first need to access S110 a pair of sets 21, 22 of feature weights (as seen in FIG. 3), i.e., a first set 21 and a second set 22, which respectively pertain to a query dataset and a reference dataset. The datasets can notably be obtained from text documents (text datafiles), images (image datafiles), or other types of files, as exemplified later. The first set 21 of feature weights comprises first weights, which are associated to first features. Similarly, the second set 22 comprises second weights, which are associated to second features. The words "first", "second", etc., are used to distinguish concepts related to the query dataset, as opposed to concepts related to the reference dataset(s), it being noted that several reference datasets may be involved, in embodiments.

"Features" means any type of components (e.g., vector components) of the datasets. Such components may possibly be extracted features (in a machine learning sense, e.g., semantic features of an image), or be features identified using any extraction or parsing method (e.g., to extract pixel values of an image or other types of components, such as words or sentences of a text document). Such features may also correspond to embedding features (e.g., words mapped onto a vector space).

The "feature weights" (or simply "weights") measure the importance or the relevance of the features considered. Such weights may notably correspond to counts or frequencies of words in text documents, or measure the importance (or relevance) of sentences or paragraphs, for example. Various schemes exist (notably in natural language processing and text normalization techniques), which can be used to estimate the weights associated to such features. For pictures, the weights may for example reflect pixel intensities, or the importance of semantic features, as known per se. The feature weights are typically representable as histograms, the bins of which represent the weights of the features.

As in EMD-like techniques (i.e., techniques related to, or derived from the EMD method, e.g., by way of approximations), the present methods proceed to discover S120 flows from the first features to the second features. However, in the present context, the flows are computed based on ground similarities (the similarities between the first features and the second features), rather than on distances between such features. The flows are computed S120 so as to maximize an overall similarity between the pair of sets 21, 22 of feature weights accessed, and thus between the corresponding datasets (or parts thereof). Eventually, the overall similarity obtained may typically measure a similarity between documents (data files) corresponding to such datasets.

Note, the present optimization problem can be conceptualized as being based on a bi-partite graph, edges of which connect first nodes associated to first bins of the first histogram (so, corresponding to the first features) to second nodes associated to bins of the second histogram (the second features). However, EMD-like methods solve a minimum cost-flow problem on the resulting graph, whereas, here, the method eventually aims at solving a similarity-flow problem.

The present methods too may initially rely on distances, instead of similarities (it being noted that a distance is also a measure of similarity), or on angles between vectors onto which the features are mapped. Eventually, though, similarities need be obtained, to solve the similarity-flow problem. Several methods are known, which allow distances (or angles between vectors) to be simply transformed in similarities (e.g., using the Euclidean distance or the cosine of the angles formed between such vectors).

Next, based on the flows discovered, pair contributions to the overall similarity are computed S120, S130, in order to obtain S130 contributive elements. The computation of the pair contributions makes use of the ground similarities between the first features and the second features. Such pair contributions denote contributions of pairs joining the first features to the second features. Note, the pair contributions can be computed as part of the computation of the overall similarity (in view to obtain the latter) or, in variants, they can be computed at a later stage, i.e., after having first obtained the overall similarity. This point is discussed later in detail.

The contributive elements are objects closely related to (or even identical to) the pair contributions. Once the contributive elements have been obtained S130, such elements are ranked S140 in order to obtain corresponding ranks. For example, the contributive element associated to the pair contribution that provides the largest contribution to the overall similarity ranks first (or is classified as belonging to top-ranking elements), whereas the contributive element associated to a pair contribution that provides the smallest contribution to the overall similarity ranks last (or is classified as a low-ranking element).

Finally, a result is returned S200, e.g., to a user or an application, where this result comprises one or more of the contributive elements and respective indications as to their respective ranks. This is exemplified later, notably in reference to FIG. 5.

The present approach modifies existing optimization methods to enable explainable machine learning, whereby elements that contribute to the similarity between datasets can easily be extracted and returned, e.g., displayed to a user. This approach may advantageously be applied at several levels of a hierarchy of the compared documents or, still, in order to achieve explainable classifications, as in preferred classes of embodiments described later. Contrary to the so-called Layerwise Relevance Propagation (LRP) techniques developed for interpreting inference results of multilayer neural networks, the present solutions do not require substantial derivative computations and are therefore simpler.

All this is described in detail below, in reference to particular embodiments of the invention. However, to fully understand the present approach, it is useful to first describe the basics of EMD-like methods.

The EMD method can be considered as the discrete version of the Wasserstein distance and can be used to quantify the affinity between discrete probability distributions. In the EMD method, each probability distribution is modelled as a histogram, wherein each bin corresponds to a weight associated to a coordinate in a multidimensional vector space. For example, when measuring the distance between greyscale images, the histogram weights can be taken as the pixel values and the coordinates are defined by the respective pixel positions (see FIG. 3 for an illustration).

In EMD-like methods, the distance between two histograms is calculated as the cost of transforming one histogram into the other. Transforming a histogram into another involves moving weights from the bins of the first histogram into the bins of the second, thereby reconstructing the second histogram from the first, as illustrated in FIG. 3(b). The goal is to minimize the total distance travelled, wherein the pairwise distances between different histogram bins are computed based on their respective coordinates. This optimization problem is notably studied in transportation theory.

Assume that two histograms p and q are being compared, where p has $h_p$ entries and q has $h_q$ entries. Assume further that an $h_p \times h_q$ nonnegative cost matrix C is available. With such notations, $p_i$ indicates the weight stored in the $i^{th}$ bin of histogram p, $q_j$ is the weight stored in the $i^{th}$ bin of histogram q, and $C_{i,j}$ is the distance (or cost) between the coordinates of the $i^{th}$ bin of p and the $i^{th}$ bin of q (see FIG. 3(b)). The histograms may further be assumed to be $L_1$-normalized, whereby $\Sigma_i p_i = \Sigma_j q_j = 1$.

The aim of the EMD method is to discover a non-negative flow matrix F, where $F_{i,j}$ indicates how much of the bin i of p has to flow to the bin j of q, such that the cost of moving p into q is minimized. Formally, the objective of EMD can be written as follows:

$$EMD(p, q) = \min_{F_{i,j} \geq 0} \sum_{i,j} F_{i,j} \cdot C_{i,j} \quad (1)$$

Strictly speaking, a valid solution has to satisfy the so-called outflow and in-flow constraints, see equations (2) and (3) below. The out-flow constraints ensure that, for each bin i of p, the sum of all the flows exiting i is equal to $p_i$. The in-flow constraints ensure that, for each j of q, the sum of all the flows entering j is equal to $q_1$. These constraints guarantee that all the mass stored in p is transferred and q is reconstructed as a result.

$$\Sigma_j F_{i,j} = p_i \quad (2)$$

$$\Sigma_i F_{i,j} = q_i \quad (3)$$

Computing the solution to EMD amounts to finding the solution of a minimum cost-flow problem on a bi-partite graph, wherein the bins of histogram p are the source nodes, the bins of histogram q are the sink nodes, and the edges between the source and sink nodes indicate the pairwise transportation costs. Solving this problem optimally takes supercubical time complexity in the size of the input histograms. Scalable low-complexity solutions have nevertheless been proposed, which reduce the complexity by relaxing the out-flow and/or the in-flow constraints partially or fully, and compute a flow matrix F as well as a lower bound on the transportation cost.

At present, modifications to EMD-like methods are discussed, which open the door to explainable cognitive models, according to embodiments. As said, the present solutions rely on a similarity-flow optimization, rather than a cost-flow optimization. In the following, the proposed approach is described in reference to the EMD technique, for simplicity illustration purposes. However, it will be apparent to the skilled person that the present approach can be applied to adaptations of or approximations to the EMD method.

To explain the similarity between two probability distributions, one may reformulate the EMD problem based on ground similarities instead of ground distances. For instance, one may use cosine similarities between embedding vectors instead of their Euclidean distances. The resulting measure can be referred to as the Earth Mover's Similarity (EMS).

Assume that histograms p and q are being compared, where p has $h_p$ entries and q has $h_q$ entries. Assume also that an $h_p \times h_q$ similarity matrix S is available, which may be pre-computed by the method or simply accessed. Again, $p_i$ denotes a weight stored in the $i^{th}$ bin of histogram p, while $q_j$ is the weight stored in the $i^{th}$ bin of histogram q, and $S_{i,j}$ denotes the similarity between the coordinates of the $i^{th}$ bin of p and the $i^{th}$ bin of q (see FIG. 3(b)). Again, the histograms are assumed to be $L_1$-normalized.

We would like to discover a non-negative flow matrix F, where $F_{i,j}$ indicates how much of the bin i of p has to flow to the bin j of q, such that the similarity between p and q is maximized. Formally, the objective of this modified EMD approach can be written as follows:

$$EMD(p, q) = \max_{F_{i,j} \geq 0} \sum_{i,j} F_{i,j} \cdot S_{i,j} \quad (4)$$

Once the flow matrix F has been computed, the similarity between the two histograms can be explained in several ways. Three ways are contemplated herein, which are all based on pair contributions $SC_{i,j}$.

First, one may compute S120, S130 the contribution of every pair of source and destination histogram bins to equation (4) as follows:

$$SC_{i,j} = F_{i,j} \cdot S_{i,j} \text{ for each pair } i,j. \quad (5)$$

Then, the pairs can be ranked S140 in terms of their contribution $SC_{i,j}$, from highest to lowest.

In other words, the pair contributions can simply be computed by multiplying matrix elements of the flow matrix F by matrix elements of the similarity matrix S, i.e., using the same components as otherwise used to compute the overall similarity between the pair of sets 21, 22 of feature weights. Indeed, the overall similarity simply corresponds to the sum of the pair contributions $SC_{i,j}$ computed over all of the pairs joining the first features to the second features, as seen in equation (4).

Note, some implementations can be devised, in which the flows may be discovered S120 without requiring to explicitly compute the overall similarity (equation (4)) first. In that case, the overall similarity may be determined after having computed the pair contributions. In more likely variants, though, the overall similarity is computed first (upon or while discovering the flows) and the pair contributions are computed a posteriori.

Once the pair contributions have been computed, one may identify S130 the contributive elements. Various types of contributive elements can be identified. In simple cases, the contributive elements may restrict to the pair contributions $SC_{i,j}$ themselves, or be obtained according to a simple function of such contributions. Pair contributions can be displayed S200 using simple visual cues (e.g., arrows of different widths in FIG. 5). Next, beyond the sole pairs, one may also want to emphasize input nodes and/or output nodes connected by such pairs. Therefore, in embodiments, additional contributive elements are obtained S130 by summing the pair contributions over the first features or the second features. Note, embodiments may be contemplated, in which only the contributions imparted to the input nodes and/or the output nodes are needed (the pair contributions would not be specifically displayed in such embodiments).

That is, one may compute S130 the contribution of every source histogram bin to the overall similarity, i.e., by summing equation (5) over bins j of q, i.e., using equation (6) as follows:

$$SC_i = \Sigma_j F_{i,j} \cdot S_{i,j} \text{ for each } i. \tag{6}$$

Then, the source bins are ranked S140 in terms of their similarity contribution $SC_i$, from highest to lowest.

In variants, one may similarly compute S130 the contribution of every destination histogram bin to the overall similarity, i.e., using equation (7) as follows:

$$SC_j = \Sigma_i F_{i,j} \cdot S_{i,j} \text{ for each } j. \tag{7}$$

Then, the destination bins are ranked S140 in terms of their similarity contribution $SC_1$, from highest to lowest.

Figure 4:
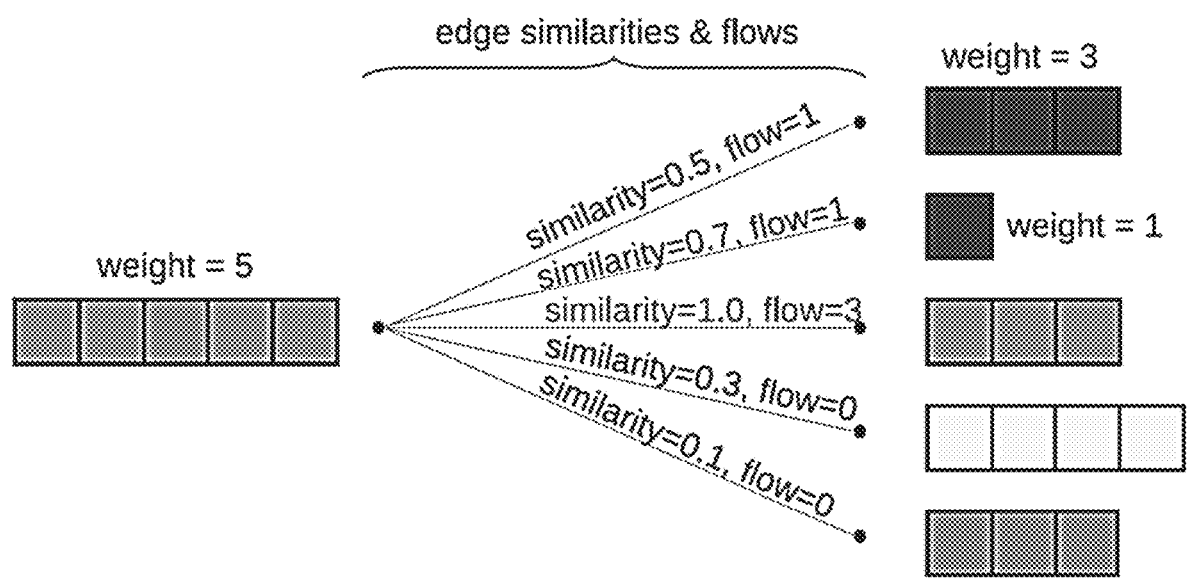
FIG. 4 is a diagram illustrating the computation of pair contributions to the similarity between two documents (or supersets of basis textual units), in accordance with an embodiment of the present invention.

For instance, FIG. 4 illustrates the computation of the contribution $SC_i$ of a source histogram bin. Namely, one computes the sum of the products of the ground similarities (i.e., $S_{i,j}$) and the flows determined according to the EMS (i.e., $F_{i,j}$) between a given source histogram bin i and all destination histogram bins j. In this simple example, given that the last two flows are zero, only the first three flows (the top flows) give rise to a net contribution. Namely, the contribution $SC_i$ of the source histogram bin selected in this example amounts to $SC_i = 1 \times 0.5 + 1 \times 0.7 + 3 \times 1.0 + 0 \times 0.3 + 0 \times 0.1$.

More generally, one may want to emphasize S200 the source bins, the destination bins, and/or the pairs of source and destination bins that provide the highest similarity contributions, e.g., using a heatmap for visual exploration. Note, only a subset of one or more of the contributive elements (the highest ranked elements) may be displayed S210, S220 to the user (as seen in FIG. 8B), where respective indications as to the respective ranks of the contributive elements are displayed as visual cues. For example, when two documents are found to be similar, their constituting features, and specific interactions between such features (those interactions that caused the similarity), can be displayed to the user, as schematically depicted in FIG. 5.

Figure 5:
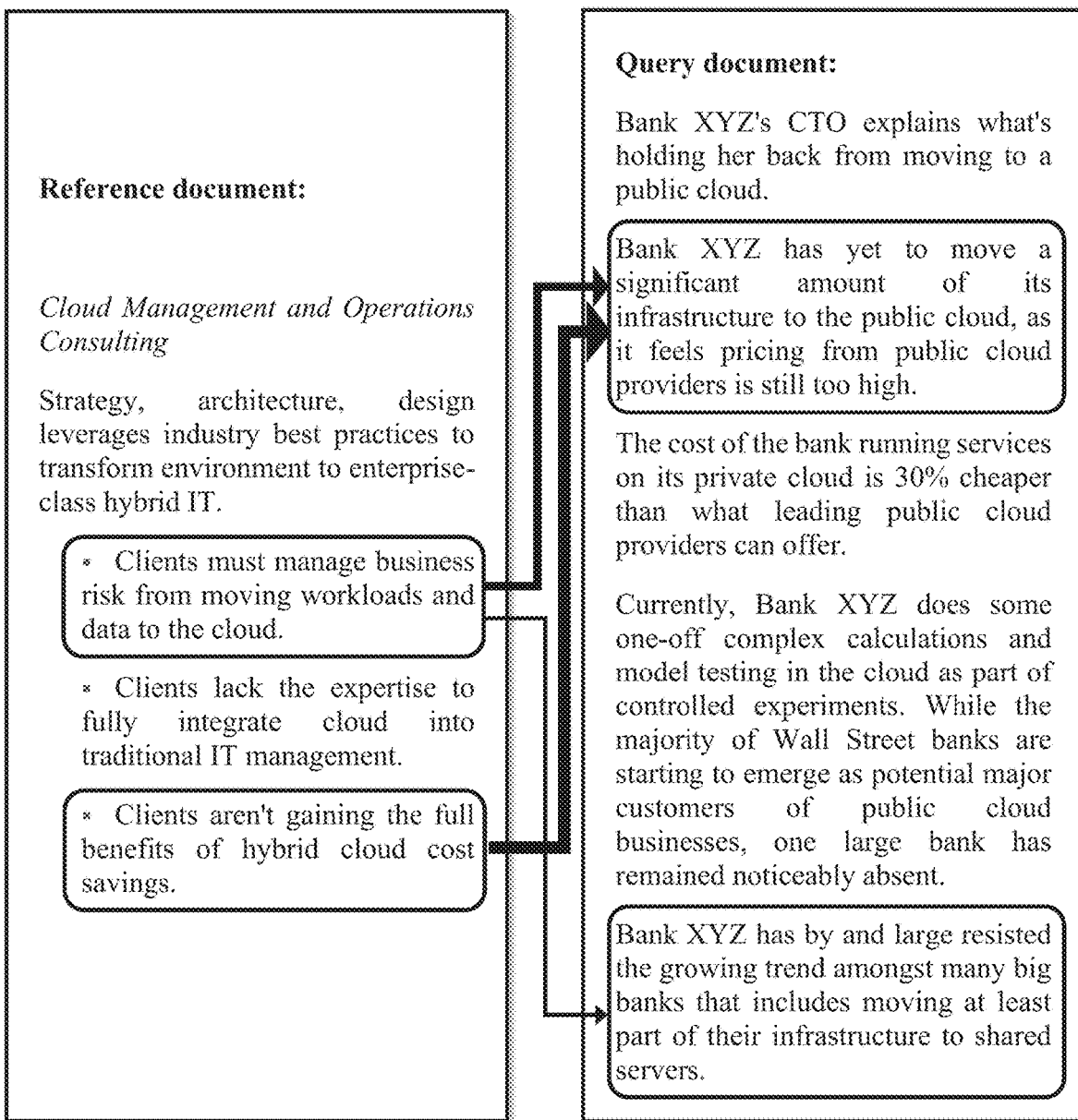
FIG. 5 schematically illustrates how results can be displayed to a user, here in respect of two text documents being compared, in accordance with an embodiment of the present invention.

The example of FIG. 5 assumes that a query document is compared to several documents. In that respect, we note that the general method discussed earlier in reference to FIG. 6 may be applied to several pairs of datasets, to compare the query document to several reference documents, one of which is eventually found to be most similar to the query document. The most similar reference document returned is the document shown in FIG. 5, alongside the query document. In this example, lower-level similarities $S_{i,j}$ pertain to sentences of the two documents. Still, such similarities would likely be obtained based on ground similarities between words in practice, according to embodiments later described in reference to FIG. 8A. The top three pair contributions (as obtained according to equation 950) are displayed using arrows of decreasing widths, together with the corresponding source and destination nodes. Visual cues are used to identify the various elements.

Various applications can similarly be devised, starting with application to text documents. With big data pipelines, enterprises are able to process large amounts of unstructured text in order to extract actionable insights. In this context, retrieving relevant documents with respect to given topics can be decisive, hence the need for efficient methods for computing document similarities. From a user point of view, identifying and understanding drivers of the resulting similarities between the documents makes it possible to more efficiently achieve a diagnostic and take business actions. Still, the need for explainability may vary among users, hence the advantage of providing flexibility in the navigation. In that respect, the similarity between documents may possibly be explained at different levels of the hierarchy of the documents, provided a model is available, which addresses the similarity between documents in a hierarchical manner through different components of the document (e.g., sentences, paragraphs, and sections).

Such a model can help users to better understand the relevance of a query document with respect to a reference document. It may for instance be useful to identify news, blogs, or analyst reports, which are relevant to a set of offerings.

A graphical user interface (GUI) may advantageously be designed to help users to understand the relevance of the retrieved documents, e.g., by highlighting the most similar parts to the description of such offerings. Ideally, the GUI may allow the user to choose the level of explainability, for instance by providing few sentences, full paragraphs, or identifying a section with relevant information (e.g., a given slide within a presentation).

Figure 1:
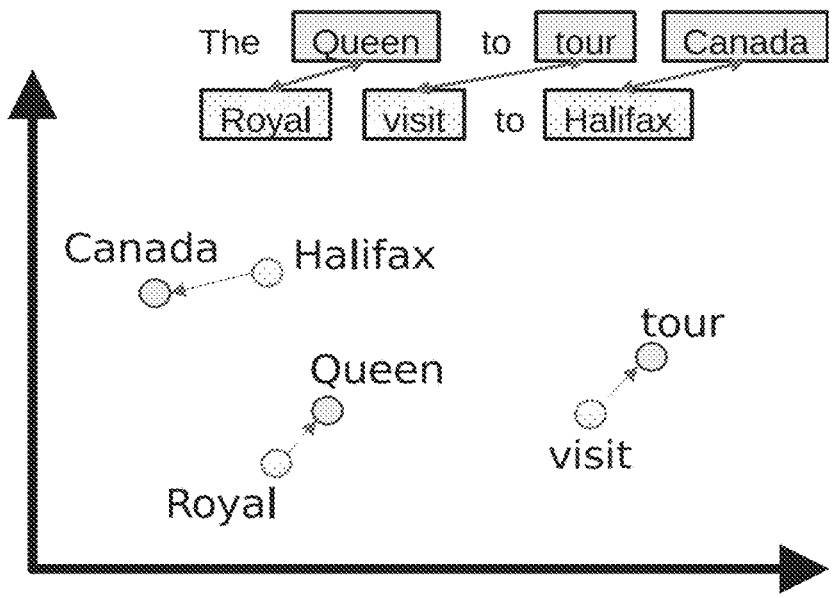
FIG. 1 illustrates how the similarity between two sentences can be measured based on words mapped onto a vector space, in accordance with an embodiment of the present invention.
Figure 2:
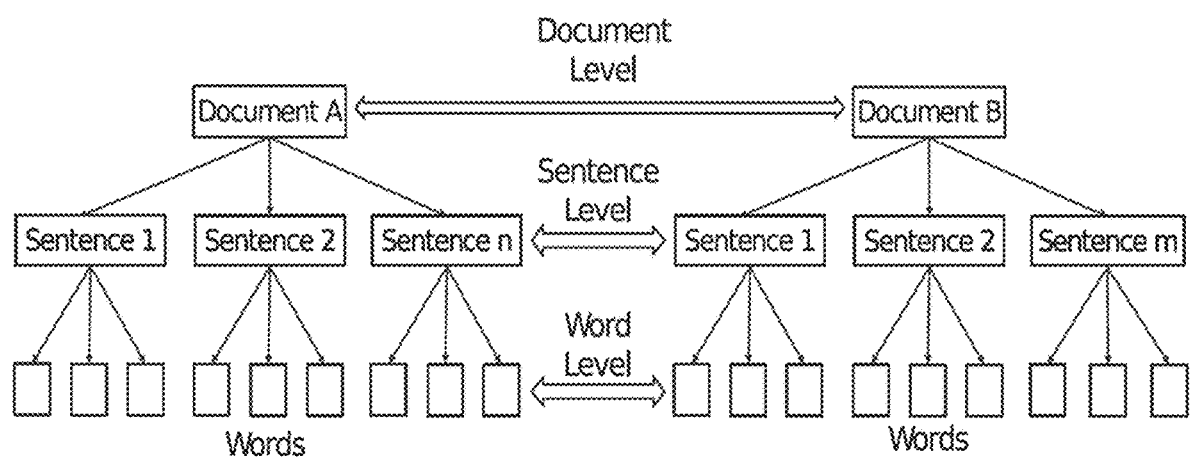
FIG. 2 is a diagram illustrating the hierarchical structure of two text documents to be compared, in accordance with an embodiment of the present invention.
Figure 8A:
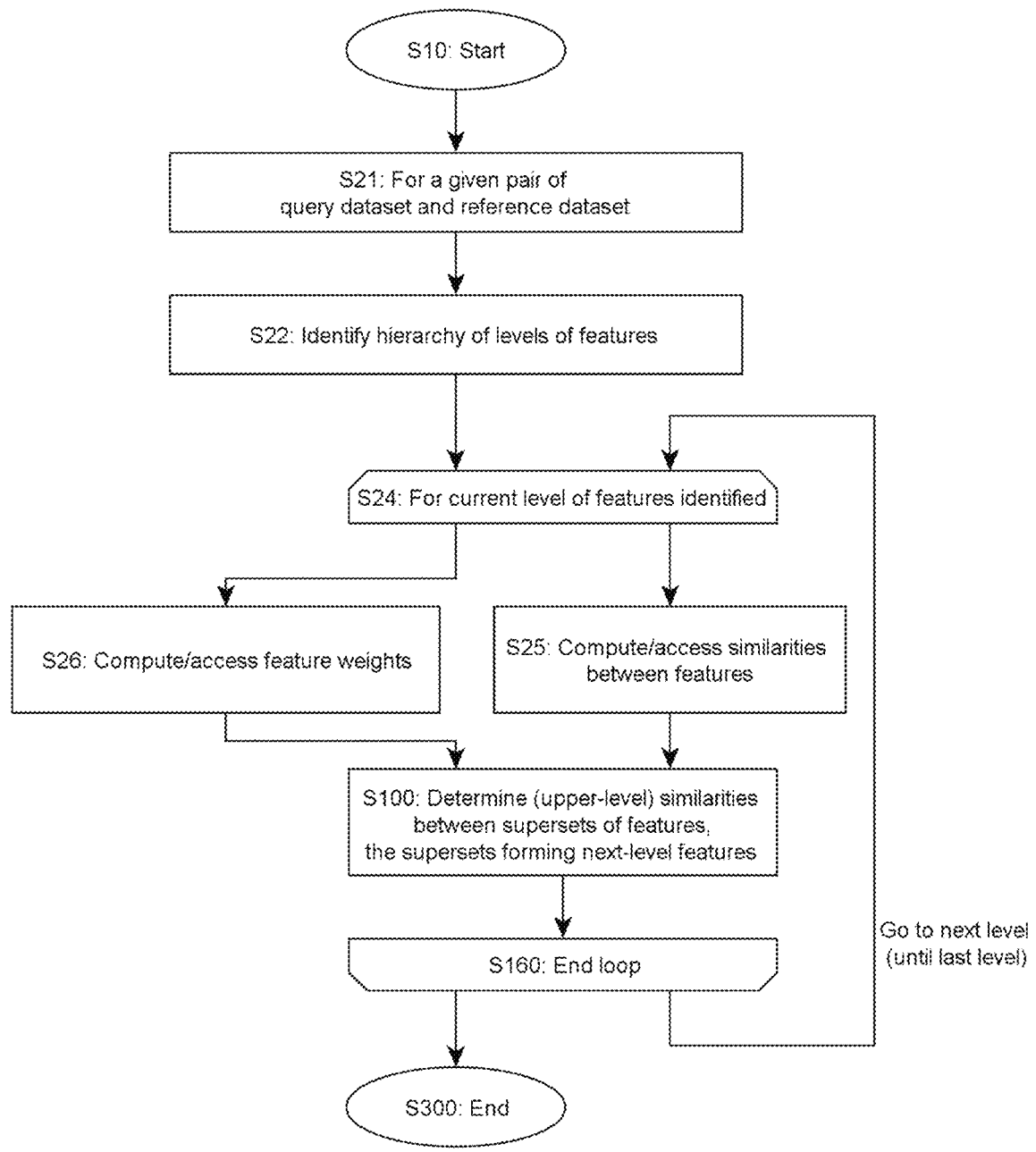
FIG. 8A exemplifies how the method of FIG. 6 can be implemented to exploit the natural hierarchical structure of the compared datasets (e.g., corresponding to text documents) and obtain pair contributions to similarities at various levels of the hierarchy, in accordance with an embodiment of the present invention.
Figure 8B:
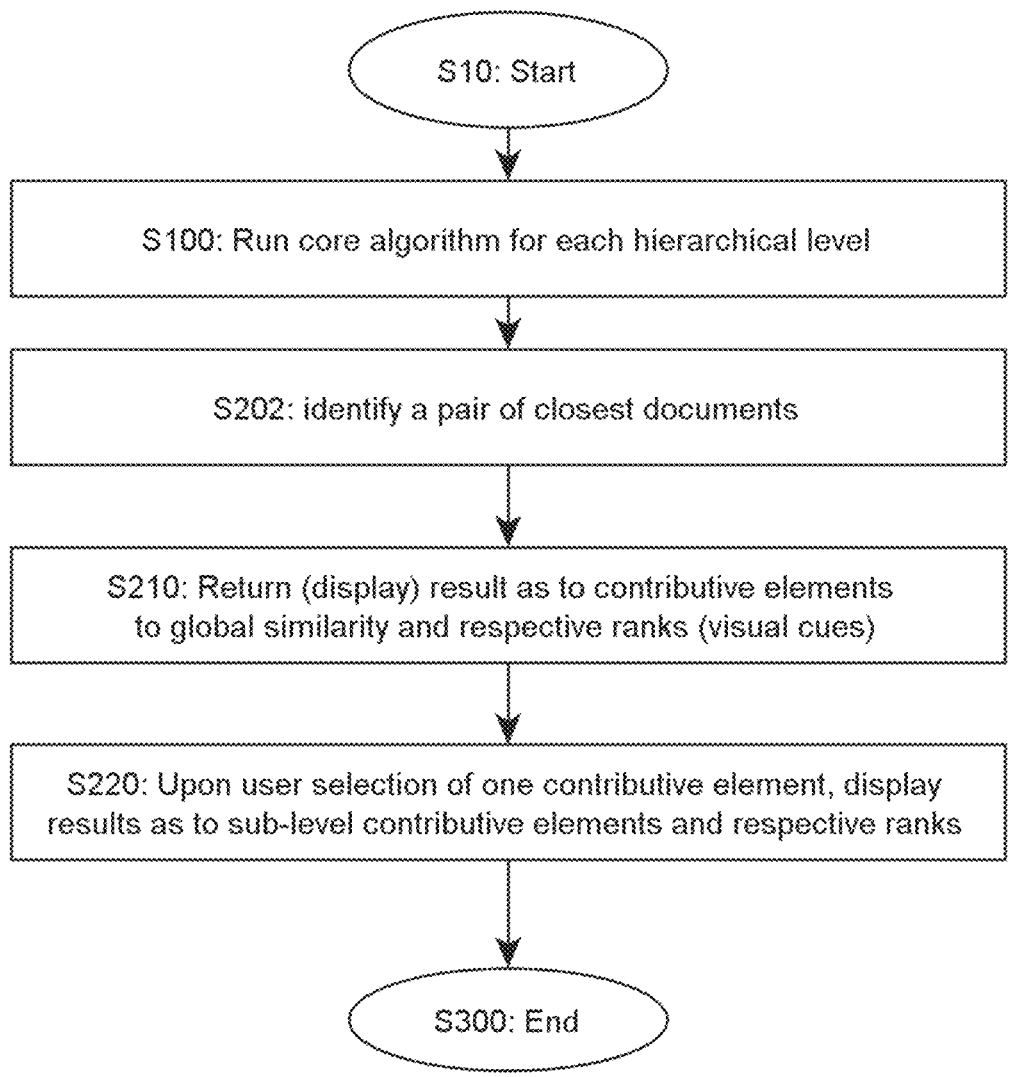
FIG. 8B illustrates the progression of the user browsing results determined according to the method of FIG. 8A, in accordance with an embodiment of the present invention.
Figure 9:
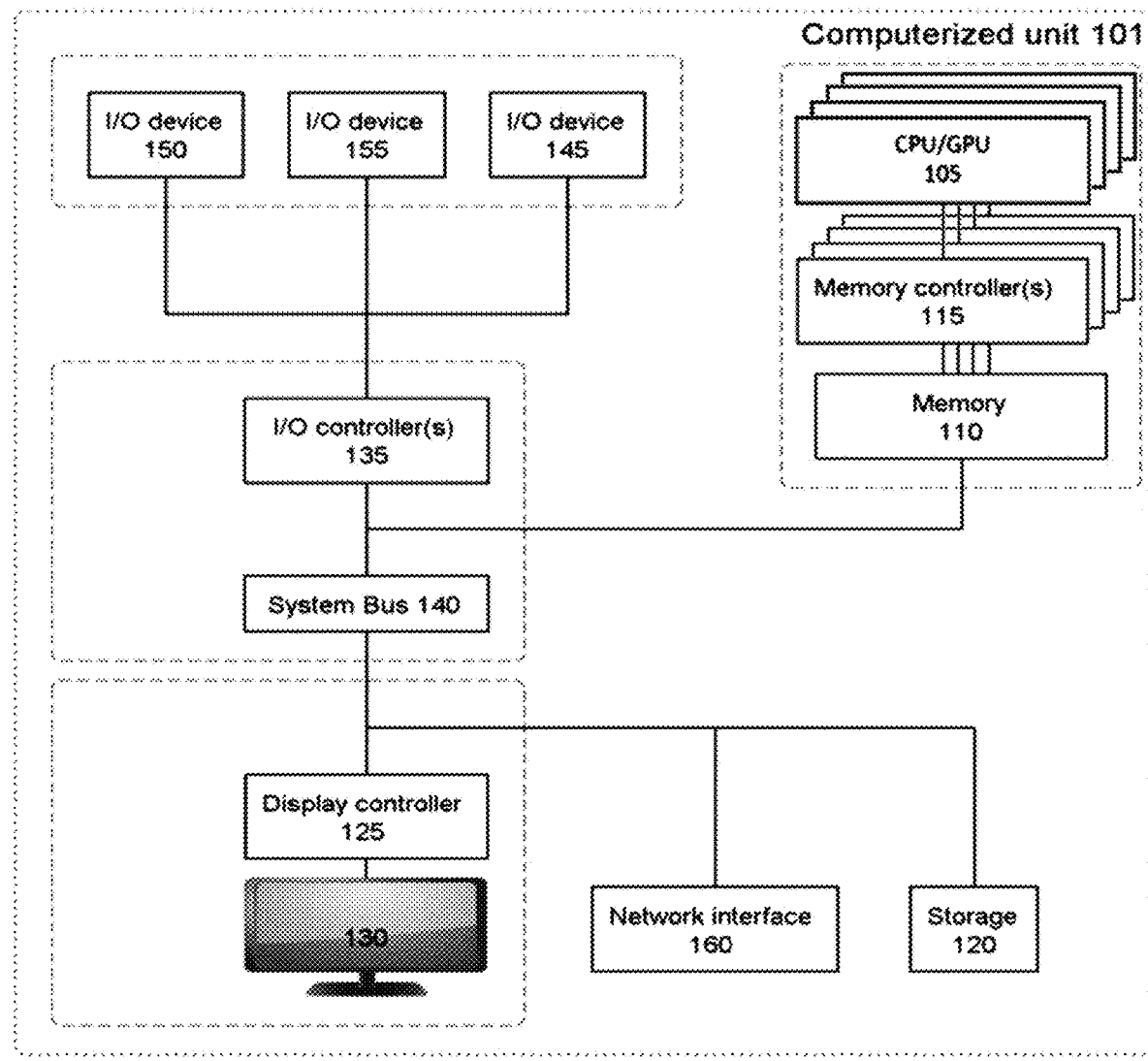
FIG. 9 schematically represents a general-purpose computerized system, suited for implementing one or more method steps as involved in embodiments of the invention.

Such a GUI shall preferably use or invoke algorithms corresponding to a particularly preferred class of embodiments, in reference to FIG. 8A. Assume that each of the query document and the reference document comprises text, for the sake of illustration. The query document and the reference documents can be transformed into respective datasets, features of which correspond to textual units of one or more words each. In other words, such textual units are subsets of the query dataset and the reference dataset. For example, the ground features (i.e., basis features) may correspond to words. Preferably then, such features are mapped onto a vector space and thereby correspond to vectors of this vector space, as illustrated in FIG. 1 (using a space of extremely reduced dimensions, for the sake of depiction). In that case, the ground similarities may easily be computed S25 based on the embedding vectors considered, in view of the discovering S120 the flows between pairs of histograms corresponding to the pairs of documents considered. One may for example use Euclidean distances d between the vectors, and then invert the distances, using any rational function, e.g., $S = 1/(1+d)$, or a polynomial function, e.g., $S = 1 - \text{Max}[1, d/d_{max}]$, where $d_{max}$ is some maximal threshold distance. Preferred, however, is to rely on the cosine similarity of (or the angular similarity between) the embedding vectors.

Next, if words are considered as ground features, the query datasets and the reference datasets will normally comprise supersets (e.g., sentences) of the ground features, and even supersets of the supersets (e.g., paragraphs or sections). Thus, one understands that the general method of FIG. 6 may not only be applied to several pairs of documents, but also to compare the hierarchical components of such documents. That is, for each pair S21 of documents, steps S110 through S140 of FIG. 6 may be performed several times in respect of several pairs of sets of feature weights, using a bottom-up approach. Namely, a first cycle of operations S110-S140 (S100) is performed a first time in respect of words, then a second cycle of operations is performed for sentences, then a third cycle of operations may possibly be performed for paragraphs, etc., and, this, for each pair of documents. This allows to discover flows from the words of each sentence of the query document to words of each sentence of the reference document, then discover flows between each pair of sentences, and so on.

Determining lower-level flows (e.g., between words) makes it possible to determine similarities at the upper level (e.g., for sentences, which are supersets of the words). At each level, the similarities are typically obtained S25 as a matrix. Such similarities are used to determine flows between same-level components, and then a similarity between upper-level components (e.g., between supersets of the sentences, such as paragraphs), and so on (e.g., sections, chapters, etc.).

For instance, and as illustrated in FIG. 8A, once flows between words of distinct datasets have been determined (during a first operation cycle, see steps S24-S160 in FIG. 8A), the method may access or compute S26 further weights, which are associated to sentences. Said "further weights" may indicate the relevance or importance of the sentences, as noted earlier. Note, the supersets too may be mapped onto a vector space (at run-time) and thereby correspond to embedding vectors (sentence vectors), if necessary.

Once weights are available S26 for sentences, further flows may be discovered S120, i.e., flows from first sentences (pertaining to the query dataset) to second sentences (pertaining to a reference document), during a second cycle of operations. These additional flows are determined based on: (i) the overall similarities found between the first sentences and the second sentences, owing to the previous cycle of operations; and (ii) the weights of the sentences as computed at step S26. These flows are computed S120 so as to maximize an upper-level similarity, i.e., a more global similarity. This similarity reflects a degree of likeness of groups of sentences of the two documents under consideration.

Next, based on the sentence similarities determined and the further flows discovered, one may compute S130 further pair contributions to the global similarity, in order to obtain further contributive elements, which are subsequently ranked S140 to obtain respective ranks. Accordingly, additional results may later be returned to a user, see FIG. 8B, which come in addition to results pertaining to the word contributions to the sentence similarities. The additional results comprise contributive elements (relating to pairs of sentences), together with indications as to their respective ranks.

The same method and principles can similarly be applied to additional levels of the hierarchy, e.g., corresponding to paragraphs, sections, etc. That is, the similarities are computed at each level, using a bottom-up approach. Exploiting the hierarchical structure of the compared documents provides additional flexibility in the subsequent user navigation.

The navigation, i.e., the progression of the user, is now described in reference to FIG. 8B. Whereas the similarities are computed using a bottom-up approach, the user progression rather follows a top-down approach in practice. For example, based on a pool of documents, the method may first compute S100 all sorts of similarities between several pairs of documents (including a query document and several reference documents), using the bottom-up approach described above in reference to FIG. 8A. The similarities pertain to various hierarchical levels of the compared documents, as explained earlier. Then, two documents may be identified S202, which are found to be the closest documents. A global similarity of such documents may be displayed to the user. Next, top-ranked contributive elements (e.g., elements corresponding to pairs of sections, paragraphs, or sentences, which contribute to the global similarity found) may be displayed S210 to the user, using suitable visual cues (as in FIG. 5). Subsequently, the user may select S220 a particular pair of sentences, which triggers the display of contributive elements from a lower level (i.e., word pairs), i.e., element that most contribute to the pair of sentences as selected at S210.

As one understands, any result as to lower-level elements (e.g., at the word level) that contribute to a given, next-level similarity (e.g., between two compared sentences) is normally returned S220 upon receiving user selection of a given, next-level element, i.e., after having returned S210 upper-level results. Thus, a top-down approach is now relied on, which allows more flexibility in the user progression. This is preferably achieved by way of an interactive GUI.

The GUI may notably involve user-modifiable parameters, initially set to default values. For example, the GUI may, by default, display similarities between the largest components available (e.g., slides, sections, or paragraphs), owing to the natural hierarchy of the compared documents. Then, upon the user selecting a given pair contribution, the GUI may, by default, display contributive elements corresponding to sentences, for example. And finally, upon selecting a given pair of sentences, the GUI may emphasize word-level contributive elements.

In the above example, each of the query dataset and the reference dataset comprises text, whereby the ground (basis) features corresponds to words, supersets of which correspond to textual units of two or more words (e.g., sentences). Additional supersets may correspond to paragraphs, sections, or slides, etc., as noted earlier. Thus, in this example, the ground similarities correspond to similarities between words, whereas upper-level similarities (also referred to as overall similarities earlier) correspond to similarities between sentences, and so on. The similarities at the successive levels are preferably captured as matrices. For example, given a word similarity matrix, one can compute similarities between all sentences, which provides a sentence matrix, and so on. Each entry in the sentence matrix preferably arises dues to an EMS-like optimization. In other words, multiple EMS optimizations are typically performed to compute the next-level similarity matrix.

In variants to text documents, the query dataset and the reference datasets may relate to images (e.g., 2D or 3D images). The features of the datasets may correspond to pixel properties (e.g., intensities, as assumed in FIG. 3) or semantic features of the images, for example. Other types of documents may also be contemplated, such as 3D printing datafiles or product datasheets.

As discussed earlier, the flows may possibly be discovered using the EMS method (introduced earlier as a variant to the EMD method), which relies on similarities instead of distances between the features considered. In variants, adaptations (e.g., WMD), or simplifications (e.g., the Relaxed WMD (RWMD)) of the EMD method may be utilized. Of particular advantage is to discover S120 the flows according to a linear-complexity optimization method, e.g., obtained as an approximation to the RWMD. Such an approximation lowers the computational burden by reducing the average time complexity to linear. In fact, a linear-complexity method may not only reduce the computational complexity, but also the storage requirements with respect to, e.g., the RWMD method, which has quadratic-time complexity. Reducing the time complexity of RWMD from quadratic to linear makes it possible to compute pairwise distances across (i) large sets of documents (e.g., millions of documents) and (ii) large histograms (e.g., millions of entries in histograms).

Referring to FIG. 9, step S120 is preferably performed using linear algebra primitives of general-purpose computing on graphics processing units (GPUs). In particular, a linear-complexity optimization algorithm may be devised to suitably map onto linear algebra primitives supported by modern GPU programming infrastructures. Moreover, a linear-complexity optimization algorithm requires a limited amount of working memory, which makes it suitable for hardware acceleration. Other embodiments can be devised that lend themselves for parallelization. More generally, the present methods are found to suitably map onto GPUs 105 and can thus be efficiently distributed across a cluster of GPUs (in particular the execution of step S120).

Figure 7:
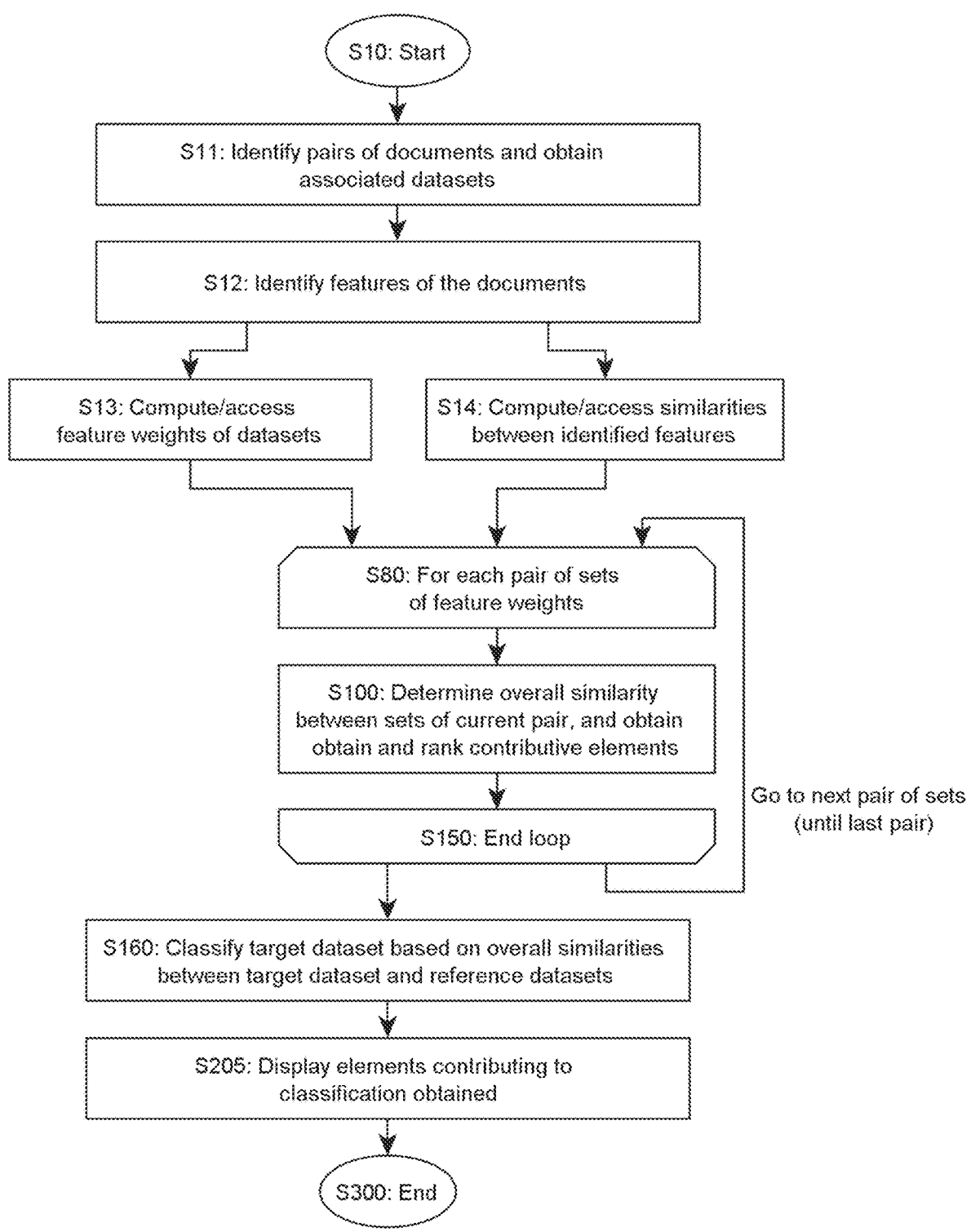
FIG. 7 illustrates steps of a method for achieving explainable classification, in accordance with an embodiment of the present invention.

Another class of embodiments is now discussed in reference to FIG. 7, which enables explainable classification operations. Again, several pairs of documents are considered S11. Each pair of documents joins a query document to a distinct one of the reference documents. A dataset is built from each document, from which features are identified or extracted S12. Thus, several pairs of sets of feature weights are again involved S13/S14, whereby the core algorithm S100 of FIG. 6 is performed multiple times in respect of the several pairs of sets of feature weights. For each pair of sets of feature weights, one set of weights pertains to the query dataset, while the other set of feature weights pertains to a reference dataset. Running the core algorithm S100 several times (one time for each pair of sets of feature weights S80) makes it possible to determine overall similarities between the query dataset and the distinct datasets until the end loop S150. Note, an additional loop may possibly be involved, to take into account the hierarchical structure of the compared documents, as described above in reference to FIG. 8A.

Assume now that the reference datasets are associated with labels, whereas the query dataset is still unlabeled. Interestingly, the query dataset may easily be classified S160 based on the labels associated to the reference datasets, according to overall similarities obtained thanks to the core algorithm S100. This makes it possible to achieve explainable classification. For example, one may compare a query document to a pool of reference documents, in order to identify the top 10 nearest-neighbor documents and then classify the query document according to the majority of classes to which the top 10 documents belong, as per their associated labels. Eventually, a result may be displayed S205, which emphasizes elements that most contribute to the classification performed.

Finally, according to another aspect, the invention can also be embodied as a computer program product for construing similarities between datasets. This program may for instance be run (at least partly) on the computerized unit 101 depicted in FIG. 9. This program product comprises a computer readable storage medium having program instructions embodied therewith, which program instructions are executable by one or more processing units (e.g., such as GPUs 105 in FIG. 9), to cause the latter to take steps according to the present methods. The program may notably execute to display a GUI. Additional aspects of the present computer program products are discussed in detail below.

Computerized systems and devices can be suitably designed for implementing embodiments of the present invention as described herein. In that respect, it can be appreciated that the methods described herein are largely non-interactive and automated. In exemplary embodiments, the methods described herein can be implemented either in an interactive, partly-interactive or non-interactive system. The methods described herein can be implemented in software, hardware, or a combination thereof. In exemplary embodiments, the methods proposed herein are implemented in software, as an executable program, the latter executed by suitable digital processing devices. More generally, embodiments of the present invention can be implemented wherein virtual machines and/or general-purpose digital computers, such as personal computers, workstations, etc., are used.

For instance, the system depicted in FIG. 9 schematically represents a computerized unit 101, e.g., a general- or specific-purpose computer.

In exemplary embodiments, in terms of hardware architecture, as shown in FIG. 9, the unit 101 includes at least one processor 105 and a memory 110 coupled to a memory controller 115. Preferably though, several processors (CPUs, and/or GPUs) are involved, to allow parallelization, as discussed earlier. To that aim, the processing units may be assigned respective memory controllers, as known per se.

One or more input and/or output (I/O) devices 145, 150, 155 (or peripherals) are communicatively coupled via a local input/output controller 135. The input/output controller 135 can be coupled to or include one or more buses and a system bus 140, as known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor(s) 105 is a hardware device for executing software, particularly that stored in memory 110. The processor(s) 105 can be any custom made or commercially available processor(s), may include one or more central processing units (CPUs) and/or one or more graphics processing units (GPUs), or, still, have an architecture involving auxiliary processors among several processors associated with the unit 101. In general, it may involve any type of semiconductor-based microprocessor (in the form of a microchip or chip set), or generally any device for executing software instructions.

The memory 110 can include any one or combination of volatile memory elements (e.g., random access memory) and nonvolatile memory elements. Moreover, the memory 110 may incorporate electronic, magnetic, optical, and/or other types of storage media. Note that the memory 110 can have a distributed architecture, where various components are situated remote from one another, but can be accessed by the processor(s) 105.

The software in memory 110 may include one or more separate programs, each of which comprises an ordered listing of executable instructions for implementing logical functions. In the example of FIG. 9, the software in the memory 110 includes computerized methods, forming part of all of methods described herein in accordance with exemplary embodiments and, in particular, a suitable operating system (OS). The OS essentially controls the execution of other computer programs and provides scheduling, input-output control, file and data management, memory management, and communication control and related services.

The methods described herein (or part thereof) may be in the form of a source program, executable program (object code), script, or any other entity comprising a set of instructions to be performed. When in a source program form, then the program needs to be translated via a compiler, assembler, interpreter, or the like, as known per se, which may or may not be included within the memory 110, so as to operate properly in connection with the OS. Furthermore, the methods can be written as an object-oriented programming language, which has classes of data and methods, or a procedure programming language, which has routines, subroutines, and/or functions.

Possibly, a conventional keyboard and mouse can be coupled to the input/output controller 135. Other I/O devices 140-155 may be included. The computerized unit 101 can further include a display controller 125 coupled to a display 130. In exemplary embodiments, the computerized unit 101 can further include a network interface or transceiver 160 for coupling to a network, to enable, in turn, data communication to/from other, external components.

The network transmits and receives data between the unit 101 and external devices. The network is possibly implemented in a wireless fashion, e.g., using wireless protocols and technologies, such as Wifi, WiMax, etc. The network may be a fixed wireless network, a wireless local area network (LAN), a wireless wide area network (WAN) a personal area network (PAN), a virtual private network (VPN), intranet or other suitable network system and includes equipment for receiving and transmitting signals.

The network can also be an IP-based network for communication between the unit 101 and any external server, client and the like via a broadband connection. In exemplary embodiments, network can be a managed IP network administered by a service provider. Besides, the network can be a packet-switched network such as a LAN, WAN, Internet network, an Internet of things network, etc.

If the unit 101 is a PC, workstation, intelligent device or the like, the software in the memory 110 may further include a basic input output system (BIOS). The BIOS is stored in ROM so that the BIOS can be executed when the computer 101 is activated. When the unit 101 is in operation, the processor(s) 105 is(are) configured to execute software stored within the memory 110, to communicate data to and from the memory 110, and to generally control operations of the computerized unit 101 pursuant to the software.

The methods described herein and the OS, in whole or in part are read by the processor(s) 105, typically buffered within the processor(s) 105, and then executed. When the methods described herein are implemented in software, the methods can be stored on any computer readable medium, such as storage 120, for use by or in connection with any computer related system or method.

Programs described herein is identified based upon the application for which it is implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for construing similarities between datasets, the computer-implemented method comprising:
    accessing a pair of sets of feature weights, wherein the sets of feature weights include (1) a first set that pertains to a query dataset and comprises first weights associated to first features and (2) a second set that pertains to a reference dataset and comprises second weights associated to second features;
    based on similarities between the first features and the second features, discovering flows from the first features to the second features, wherein the flows maximize an overall similarity between the pair of sets of feature weights;
    based on the similarities and the flows, computing pair contributions to the overall similarity in order to obtain contributive elements, wherein the pair contributions are contributions of pairs joining the first features to the second features;
    ranking the contributive elements to obtain respective ranks; and
    returning a result comprising the contributive elements and indications to the respective ranks.

2. The computer-implemented method according to claim 1, wherein:
    the pair contributions are computed by multiplying a first plurality of matrix elements of a flow matrix by a second plurality of matrix elements of a similarity matrix, the flow matrix and the similarity matrix capturing the discovered flows and the similarities, respectively; and
    the overall similarity corresponds to a sum of the pair contributions computed over all of the pairs joining the first features to the second features.

3. The computer-implemented method according to claim 1, wherein returning the result comprises:
    displaying a subset of the contributive elements that are highest ranked elements according to the respective ranks; and
    the indications as to the respective ranks of the contributive elements are displayed as one or more visual cues.

4. The computer-implemented method according to claim 1, wherein the contributive elements are obtained as the pair contributions.

5. The computer-implemented method according to claim 1, wherein the contributive elements are obtained by summing the pair contributions over the first features or the second features.

6. The computer-implemented method according to claim 1, wherein the flows are discovered according to a linear-complexity optimization method.

7. The computer-implemented method according to claim 1, wherein the flows are discovered using linear algebra primitives of general-purpose computing on graphics processing units, an execution of which is distributed across a cluster of graphics processing units.

8. The computer-implemented method according to claim 1, wherein the overall similarity is determined based on the pair contributions.

9. The computer-implemented method according to claim 1, wherein the accessing the pair of sets, the discovering the flows, the computing the pair contributions, and the ranking the contributive elements are performed iteratively in respect of several pairs of sets of feature weights, wherein one set of feature weights of each of the several pairs pertains to the query dataset and other sets of feature weights of the several pairs pertain to distinct datasets, and wherein the distinct datasets include the reference dataset.

10. The computer-implemented method according to claim 9, further comprising:
classifying the query dataset based on labels and according to the overall similarities determined, wherein the distinct datasets are associated to the labels.

11. The computer-implemented method according to claim 1, wherein:
the query dataset and the reference dataset pertain to images; and
the first features and the second features each correspond to one of a pixel property or a semantic feature of a respective one of the images.

12. The computer-implemented method according to claim 1, wherein:
each of the query dataset and the reference dataset comprises text; and
the first features and the second features each correspond to textual units of one or more words, wherein the textual units are subsets of the query dataset and the reference dataset.

13. The computer-implemented method according to claim 12, wherein each of the first features and the second features corresponds to a word.

14. The computer-implemented method according to claim 1, further comprising:
wherein the first features and the second features are mapped onto a vector space and correspond to vectors of the vector space; and
prior to discovering the flows, computing the similarities based on the vectors corresponding to the first features and the second features.

15. The computer-implemented method according to claim 1, wherein the sets of feature weights are representable as histograms.

16. The computer-implemented method according to claim 1, wherein:
the query dataset comprises first supersets of the first features and the reference dataset comprises second supersets of the second features; and
the accessing the pair of sets, the discovering the flows, the computing the pair contributions, and the ranking the contributive elements are all performed several times in respect of several pairs of sets of feature weights that include the pair of sets of feature weights to determine overall similarities between the first supersets and the second supersets.

17. The computer-implemented method according to claim 16, further comprising:
accessing further weights associated to the first supersets and the second supersets;
based on the overall similarities between the first supersets and the second supersets and the further weights, discovering further flows from the first supersets to the second supersets that maximize a global similarity between the query dataset and the reference dataset; based on the overall similarities and the further flows, computing further pair contributions to the global similarity to obtain further contributive elements, wherein the further pair contributions correspond to further pairs joining the first supersets to the second supersets;
ranking the further contributive elements to obtain further respective ranks; and
returning a further result comprising one or more of the further contributive elements together with further indications as to the further respective ranks.

18. The computer-implemented method according to claim 16, wherein:
each of the query dataset and the reference dataset comprises text;
each of the first features and the second features corresponds to words; and
each of the first superset and the second superset corresponds to a textual unit of two or more words.

19. A computer program product for construing similarities between datasets, the computer program product comprising;
one or more computer readable storage media and program instructions stored on the one or more computer readable storage media, the program instructions comprising:
program instructions to access a pair of sets of feature weights, wherein the sets of feature weights include (1) a first set that pertains to a query dataset and comprises first weights associated to first features and (2) a second set that pertains to a reference dataset and comprises second weights associated to second features;
based on similarities between the first features and the second features, program instructions to discover flows from the first features to the second features, wherein the flows maximize an overall similarity between the pair of sets of feature weights;
based on the similarities and the flows, program instructions to compute pair contributions to the overall similarity in order to obtain contributive elements, wherein the pair contributions are contributions of pairs joining the first features to the second features;
program instructions to rank the contributive elements to obtain respective ranks; and
program instructions to return a result comprising the contributive elements and indications to the respective ranks.

20. A computer system for construing similarities between datasets, the computer system comprising:
one or more computer processors;
one or more computer readable storage media;
program instructions stored on the computer readable storage media for execution by at least one of the one or more processors, the program instructions comprising:
program instructions to access a pair of sets of feature weights, wherein the sets of feature weights include (1) a first set that pertains to a query dataset and comprises first weights associated to first features and (2) a second set that pertains to a reference dataset and comprises second weights associated to second features;
based on similarities between the first features and the second features, program instructions to discover flows from the first features to the second features, wherein the flows maximize an overall similarity between the pair of sets of feature weights;
based on the similarities and the flows, program instructions to compute pair contributions to the overall similarity in order to obtain contributive elements, wherein the pair contributions are contributions of pairs joining the first features to the second features;

program instructions to rank the contributive elements to obtain respective ranks; and program instructions to return a result comprising the contributive elements and indications to the respective ranks.

* * * * *